(12) United States Patent
Lee et al.

(10) Patent No.: US 8,630,773 B2
(45) Date of Patent: Jan. 14, 2014

(54) WASTE COLLECTION VEHICLE AND METHOD FOR MONITORING SAFETY OF VEHICLE

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/523,946

(22) Filed: Jun. 15, 2012

(65) Prior Publication Data

US 2013/0151083 A1 Jun. 13, 2013

(30) Foreign Application Priority Data

Dec. 9, 2011 (TW) .................................. 100145486

(51) Int. Cl.
*G06K 9/34* (2006.01)
(52) U.S. Cl.
USPC ............................................ 701/45; 348/143

(58) Field of Classification Search
USPC .............................................. 701/45; 348/143
See application file for complete search history.

(56) References Cited

U.S. PATENT DOCUMENTS

| 5,637,933 A * | 6/1997 | Rawlings et al. ............. 307/147 |
| 2004/0057177 A1 * | 3/2004 | Glahn et al. ..................... 361/62 |
| 2007/0075584 A1 * | 4/2007 | Moriya et al. ................. 307/9.1 |

* cited by examiner

*Primary Examiner* — Mary Cheung
*Assistant Examiner* — Yuen Wong
(74) *Attorney, Agent, or Firm* — Altis Law Group, Inc.

(57) ABSTRACT

A method for monitoring safety of a waste collection vehicle, a digital image is captured by an image capturing device positioned on the waste collection vehicle. The method detects a person in the digital image, and controls a safety device to cut of power being supplied to the waste collection vehicle if the person has been detected. The method further outputs alarm messages by lighting one or more signal lamps of the waste collection vehicle.

17 Claims, 7 Drawing Sheets

WASTE COLLECTION VEHICLE AND METHOD FOR MONITORING SAFETY OF VEHICLE

BACKGROUND

1. Technical Field

Embodiments of the present disclosure relate to security and safety technology, and particularly to a waste collection vehicle and method for monitoring safety of persons around the waste collection vehicle.

2. Description of Related Art

Waste collection vehicles (i.e., garbage trucks) have been used to collect quantities of waste and haul the collected waste to a solid waste treatment facility. Many waste collection vehicle cannot detect when a person walks close to the waste-lifting or waste-compacting mechanisms (e.g., a rear loader) of the vehicle. If the movement of the waste-lifting or the waste-compacting mechanisms is not stopped in time, the person may be injured. Therefore, an efficient method for monitoring safety of the waste collection vehicle is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
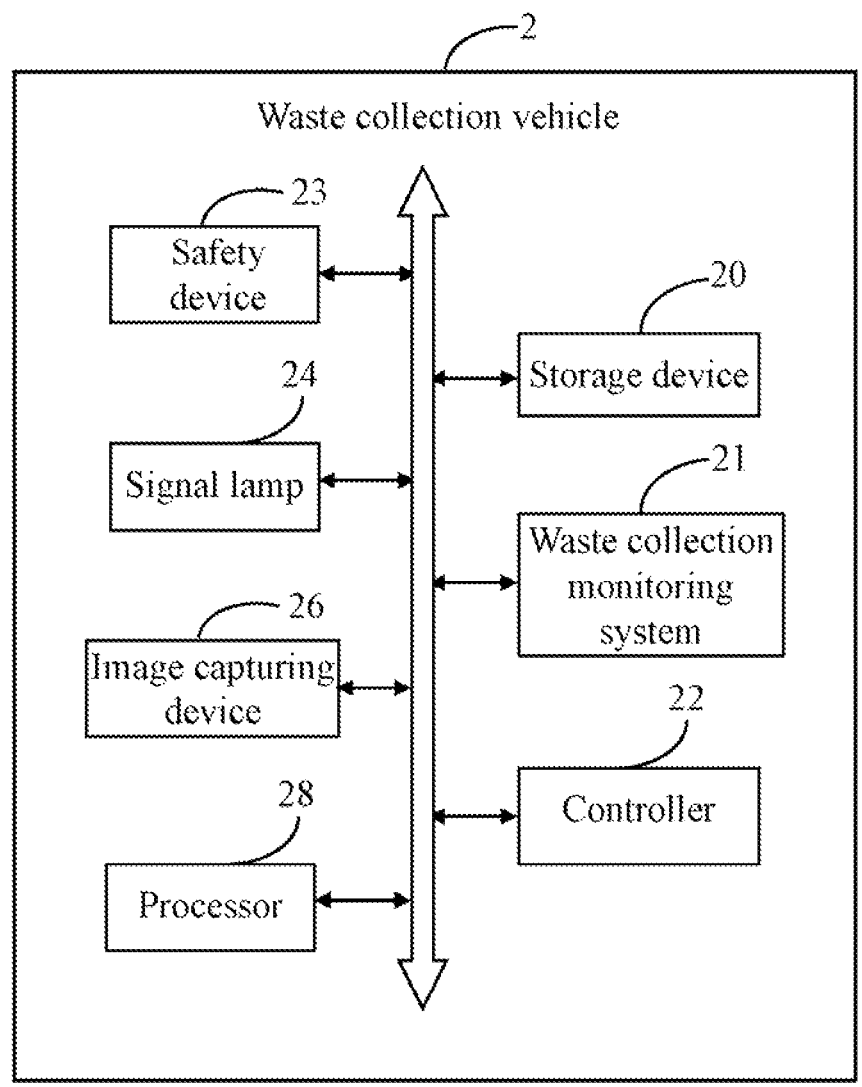
FIG. 1 is a schematic diagram of one embodiment of a waste collection vehicle including a waste collection monitoring system.

FIG. 1 is a block diagram of one embodiment of a waste collection vehicle 2 including a waste collection monitoring system 21. The waste collection vehicle 2 further includes a storage device 20, a controller 22, a safety device (e.g., a fuse socket) 23, one or more signal lamps 24, an image capturing device 26, and at least one processor 28. It should be understood that FIG. 1 illustrates only one example of the waste collection vehicle 2 that may include more or fewer components than illustrated (e.g., at least one processor), or a different configuration of the various components in other embodiments.

Figure 4:
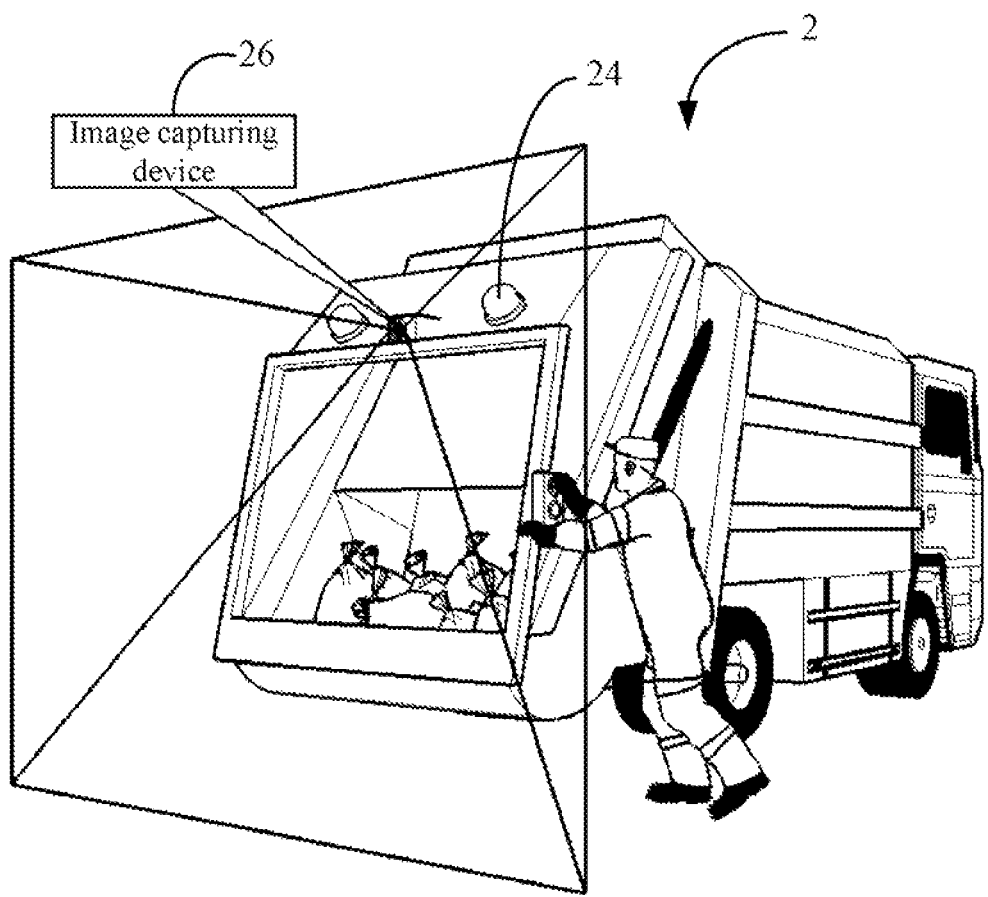
FIG. 4 is a schematic diagram of an example of the waste collection vehicle.

In one embodiment, as shown in FIG. 4, the signal lamps 24 and the image capturing device 26 are positioned on a rear loader of the waste collection vehicle 2. The controller 22 is used to control movements of the rear loader so that the vehicle 2 collects waste and hauls the collected waste to a waste treatment facility. In other embodiments, the image capturing device 26 may be positioned elsewhere (e.g., on the front for a front loader) of the waste collection vehicle 2.

Figure 5:
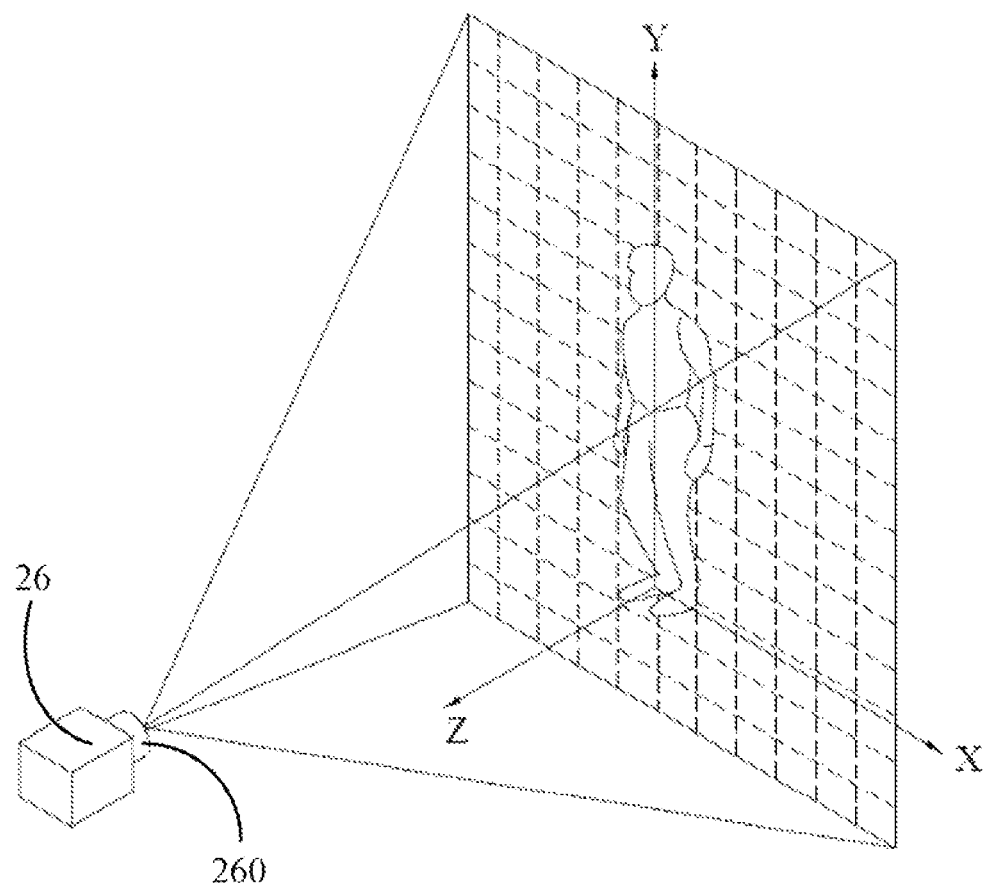
FIG. 5 and FIG. 6 show examples of captured three dimensional (3D) images using an image capturing device positioned on the waste collection vehicle.

In one embodiment, the image capturing device 26 may be a depth-sensing camera, such as a time-of-flight (TOF) camera, as shown in FIG. 5. In this embodiment, the image capturing device 26 is a camera system that captures a distance from a target object in a scene being captured to a lens 260 of the image capturing device 26 (distance information) using the TOF principle, which can obtain a distance between the lens 260 and each point on the target object which has been captured. Thus, each image captured by the image capturing device 26 includes distance information between the lens 260 and each point on the target object in the image.

In one embodiment, the image capturing device 26 is used to obtain a digital image of a monitored area and store the digital image in the storage device 20. The waste collection monitoring system 21 controls the safety device 23 to cut off power (whether electrical, hydraulic, or otherwise) being supplied to the waste-lifting or waste-compacting mechanisms of the waste collection vehicle 2 when a person has been detected in the digital image, and outputs an alarm message by lighting the signal lamps 24.

Figure 6:
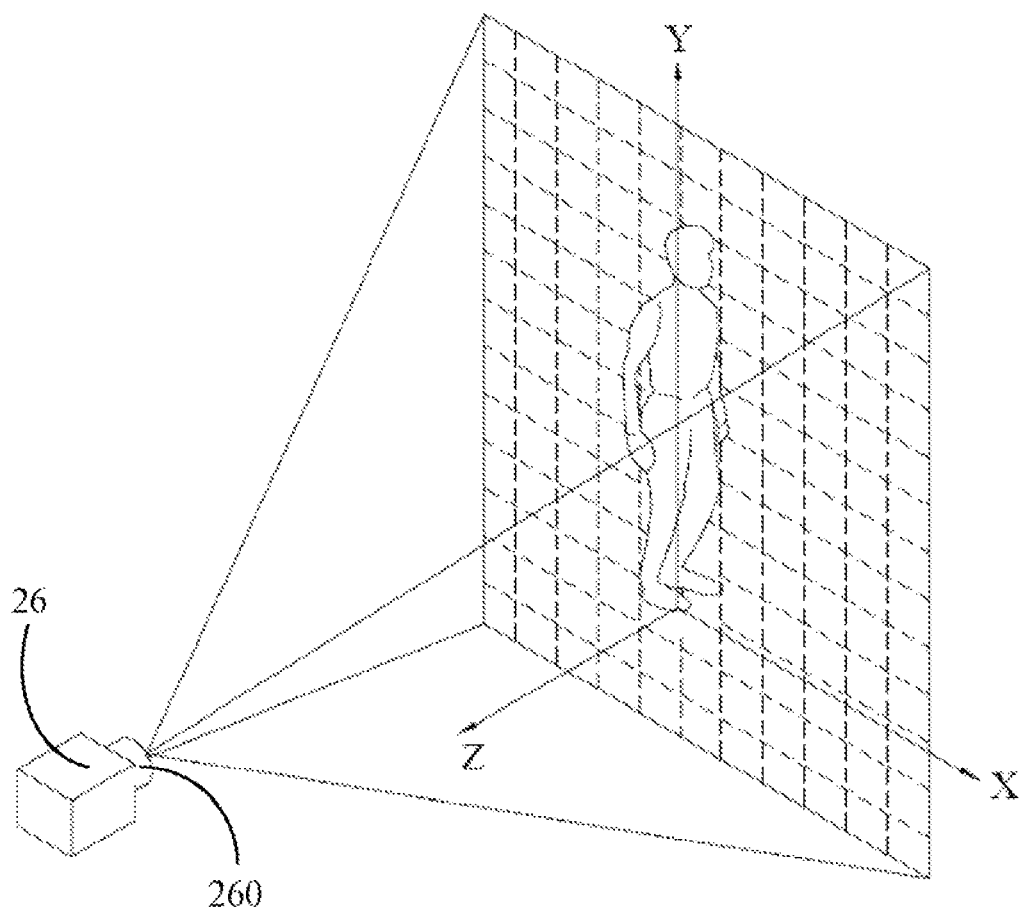

In one embodiment, the storage device 20 stores three dimensional (3D) images and 3D image templates of the person. The 3D images are captured by the image capturing device 26. In one embodiment, the 3D images may include frontal images (as shown in FIG. 5) and side images (as shown in FIG. 6), for example. A frontal image of a person is an image captured when the person is facing the image capturing device 26, and a side image of the person is an image captured when the person is in profile, or side-on, to the image capturing device 26. Depending on the embodiment, the storage device 20 may be a smart media card, a secure digital card, a compact flash card, or any other memory storage device.

The waste collection monitoring system 21 is used to receive the digital image (i.e., the 3D image) from the image capturing device 26, and determine if the digital image includes an image sub-area, which is defined as an object that includes character points that can be used to construct an outline of a person. In this embodiment, the character points (such as the nose, the eyes) represent points that can be used to construct an outline of the person. If the digital image includes an image sub-area, the waste collection monitoring system 21 determines that the digital image includes a person, and controls the safety device 23 to cut off power being supplied to the waste collection vehicle 2, and output an alarm message by lighting the signal lamps 24. In one embodiment, the waste collection monitoring system 21 may include computerized instructions in the form of one or more programs that are executed by the at least one processor 28 and stored in the storage device 20 (or memory). A detailed description of the waste collection monitoring system 21 will be given in the following paragraphs.

Figure 2:
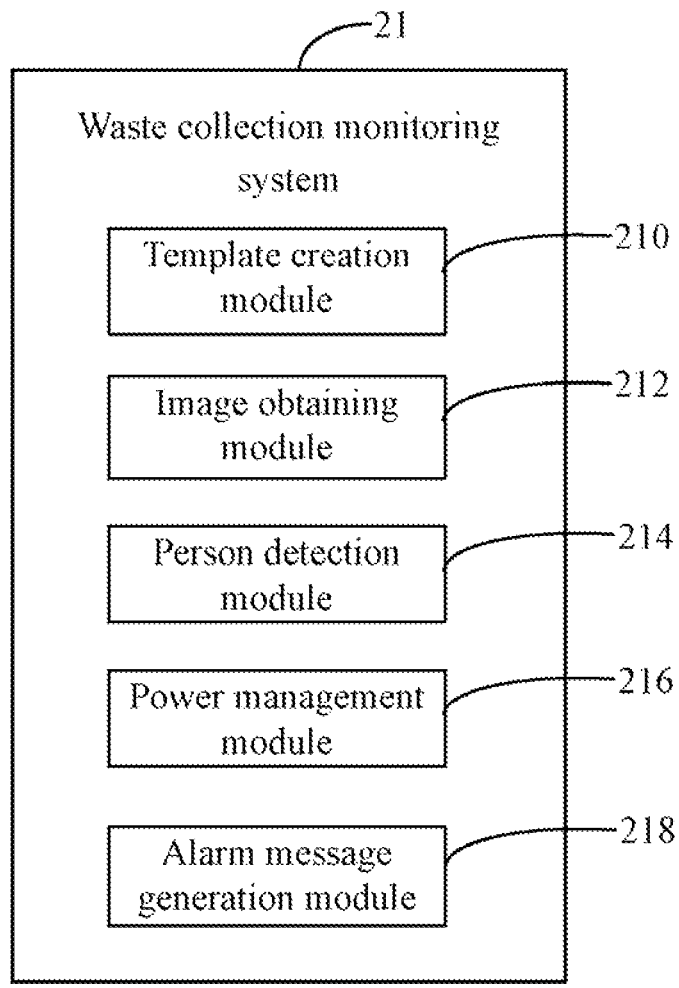
FIG. 2 is a schematic diagram of function modules of the waste collection monitoring system included in the waste collection vehicle.

FIG. 2 is a block diagram of function modules of the waste collection monitoring system 21 included in the waste collection vehicle 2. In one embodiment, the waste collection monitoring system 21 may include one or more modules, for example, a template creation module 210, an image obtaining module 212, a person detection module 214, a power management module 216, and an alarm message generation module 218. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
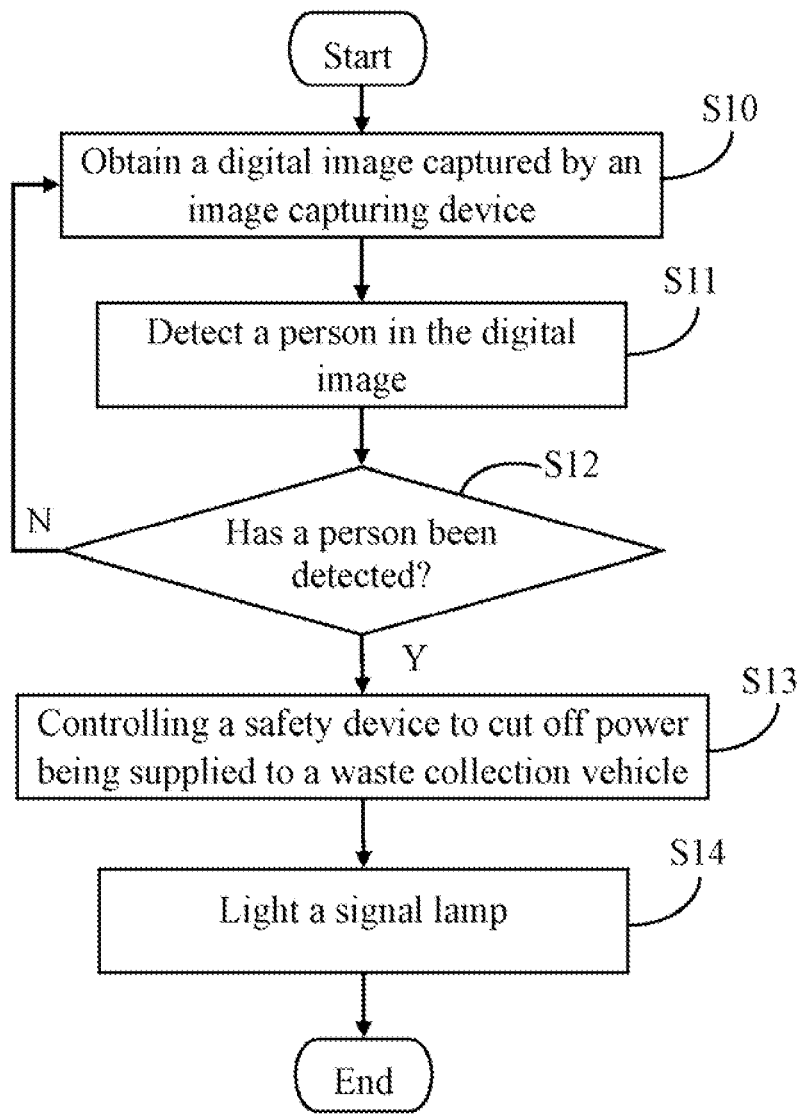
FIG. 3 is a flowchart of one embodiment of a method for monitoring safety of the waste collection vehicle.

FIG. 3 is a flowchart of one embodiment of a method for monitoring safety around the waste collection vehicle 2. Depending on the embodiment, additional steps may be added, others removed, and the ordering of the steps may be changed.

Before describing the flowchart of FIG. 3, the template creation module 210 creates a 3D image template for storing an allowable range of a pixel value of same character point according to the distance information in the 3D images. In some embodiments, the template creation module 210 reads a 3D image N1 (as shown in FIG. 6), obtains a distance between the lens 260 and each character point of the subject of the 3D image N1. For example, a distance between the lens 260 and the nose may be 61 cm, a distance between the lens 260 and the forehead may be 59 cm.

The template creation module 210 further converts each distance into a pixel value, for example, 61 cm may be converted to 255, and 59 cm may be converted to 253, and stores the pixel value of each character point into a character matrix of the 3D image. The character matrix is a data structure used for storing the pixel values of the character points in the 3D image. Furthermore, the template creation module 210 aligns all character matrices of the 3D images based on a predetermined character point, such as a center of the person in each 3D image, and records pixel values of same character points in different character matrices into the 3D image template. The pixel values of the same character point in different character matrices are regarded as the allowable range of the pixel value of the same character point. For example, an allowable range of the pixel value of the nose may be [251, 255], and an allowable range of the forehead may be [250, 254].

In block S10, when the waste collection vehicle 2 starts up, the image obtaining module 212 obtains a digital image captured by the image capturing device 26 positioned on a rear loader of the waste collection vehicle 2 at each preset time interval (e.g., one second).

In block S11, the person detection module 214 detects a person in the digital image. In one embodiment, the detected person is located in a specified scene (e.g. a space near the rear loader of the vehicle 2). A detailed description is provided as follows.

First, the person detection module 214 converts a distance between the lens 260 and each point of the specified scene in the digital image into a pixel value of the point, and creates a character matrix of the digital image. Second, the person detection module 214 compares a pixel value of each point in the character matrix with a pixel value of a corresponding character point in the 3D image template. Third, the person detection module 214 determines if the digital image has a person by determining if an image sub-area (a sub-area of the digital image) has a first specified number (e.g., n1) of points in the digital image. In some embodiments, if a pixel value of each point in the image sub-area is within an allowance range of a corresponding character point in the 3D image template, the person detection module 214 determines that the image sub-area is the detected person in the digital image.

For example, a pixel value of the nose in the character matrix is compared with the pixel value of the nose in the 3D image template. The 3D image template may store a number Q1 of character points, and the first specified number may be set as Q1*80%. If the image sub-area exists in the digital image, the person detection module 214 determines that the image sub-area is a detected person.

In block S12, the person detection module 214 determines if the person has been detected in the digital image. If the person has been detected in the digital images, the procedure goes to block S13. If the person has not been detected in the digital image, the procedure returns to block S10.

In block S13, the power management module 216 controls the safety device 23 to cut off power being supplied to the waste-lifting or waste-compacting mechanisms of the waste collection vehicle 2. In other embodiment, if the person has been detected in the digital image, the person detection module 201 further determines a minimum distance between the lens 260 of the image capturing device 26 and each point on the person in the digital image. If the minimum distance is less than a preset value (e.g., 0.5 meters), the power management module 216 controls the safety device 23 to cut off power being supplied to the waste collection vehicle 2.

Figure 7:
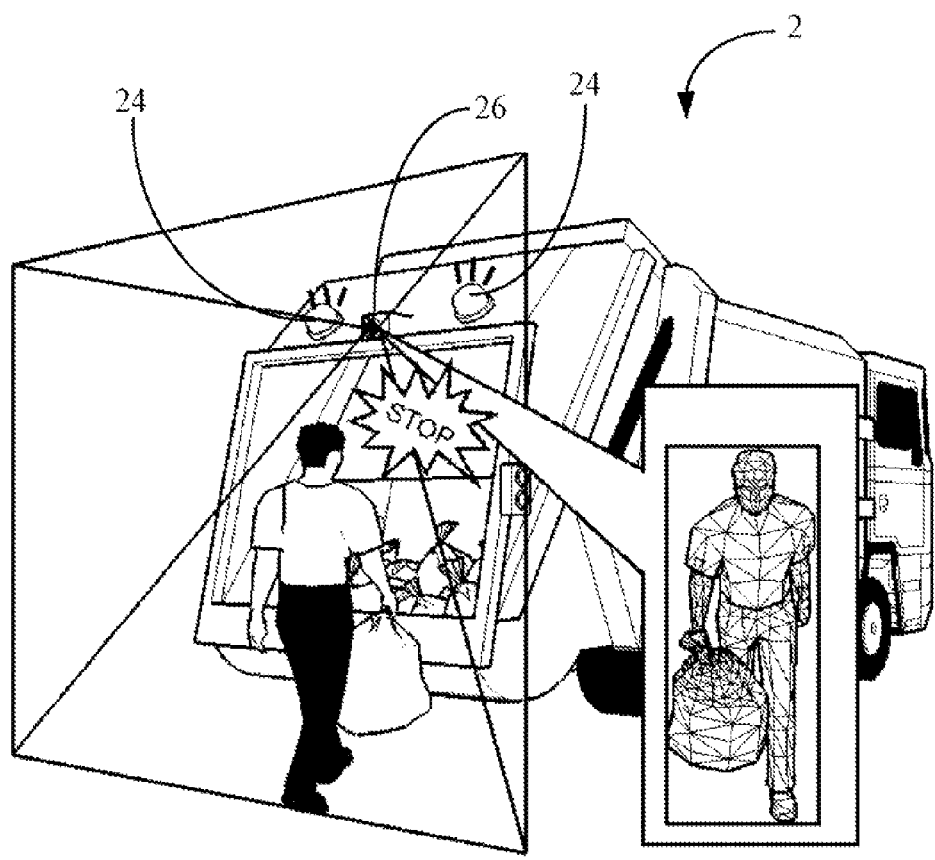
FIG. 7 is a schematic diagram of an example for giving an alarm when a person is detected in dangerous proximity to the waste collection vehicle.

In block S14, the alarm message generation module 218 outputs alarm messages by lighting the signal lamps 24 (referring to FIG. 7). In this embodiment, if a waste collection operation is stopped and the signal lamps 24 are lit, it is an indication that a person is close or too close to the waste collection vehicle 2. If the waste collection operation is stopped, but the signal lamps 24 are not lit, it is an indication that no-one appears to be dangerously near the waste collection vehicle 2.

In other embodiments, the alarm message generation module 218 may output alarm messages audibly, using one or more buzzers or speakers of the waste collection vehicle 2, where the buzzers or the speakers may be positioned on the controller 22.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for monitoring safety of a waste collection vehicle, the method comprising:
    obtaining a digital image captured by an image capturing device positioned on the waste collection vehicle, and creating a character matrix of the digital image by converting a distance between a lens of the image capturing device and each point in the digital image into a pixel value of the point;
    detecting a person in the digital image by comparing a pixel value of each point in the character matrix with a pixel value of a corresponding character point in a three dimensional (3D) image template, and determining an image sub-area in the digital image being the person when the image sub-area has a first specified number of points existing in the digital image, a pixel value of each point in the image sub-area being within an allowance range of a corresponding character point in the 3D image template; and cutting off power being supplied to the waste collection vehicle using a safety device of the waste collection vehicle upon the condition that the person has been detected.

2. The method according to claim 1, further comprising: outputting alarm messages by lighting one or more signal lamps of the waste collection vehicle.

3. The method according to claim 1, further comprising: outputting alarm messages using one or more buzzers or speakers of the waste collection vehicle.

4. The method according to claim 1, further comprising: creating the 3D image template that stores an allowable range of a pixel value of a character point according to a distance information in a plurality of 3D images captured by the image capturing device.

5. The method according to claim 4, wherein the 3D image template is created by:
   reading a distance between the lens of the image capturing device and each character point of a subject of a pre-captured 3D image;
   converting each distance into a pixel value, and storing the pixel value of each character point into a character matrix of the pre-captured 3D image; and
   aligning all character matrices of the pre-captured 3D images based on a predetermined character point, and recording pixel values of same character points in different character matrices as the allowable range of the pixel value of the same character points.

6. A computer-implemented method for monitoring safety of a waste collection vehicle, the method comprising:
   obtaining a digital image captured by an image capturing device positioned on the waste collection vehicle, and creating a character matrix of the digital image by converting a distance between a lens of the image capturing device and each point in the digital image into a pixel value of the point;
   detecting a person in the digital image by comparing a pixel value of each point in the character matrix with a pixel value of a corresponding character point in a three dimensional (3D) image template, and determining an image sub-area in the digital image being the person when the image sub-area has a first specified number of points existing in the digital image, a pixel value of each point in the image sub-area being within an allowance range of a corresponding character point in the 3D image template;
   determining a minimum distance between the lens of the image capturing device and each point on the person in the digital image upon the condition that the person has been detected; and
   cutting off power being supplied to the waste collection vehicle using a safety device of the waste collection vehicle upon the condition that the minimum distance is less than a preset value.

7. The method according to claim 6, further comprising: outputting alarm messages by lighting one or more signal lamps of the waste collection vehicle upon the condition that the minimum distance is less than the preset value.

8. The method according to claim 6, further comprising: outputting alarm messages using one or more buzzers or speakers of the waste collection vehicle upon the condition that the minimum distance is less than the preset value.

9. The method according to claim 6, further comprising: creating the 3D image template that stores an allowable range of a pixel value of a character point according to a distance information in a plurality of 3D images captured by the image capturing device.

10. The method according to claim 9, wherein the 3D image template is created by:
    reading a distance between the lens of the image capturing device and each character point of a subject of a pre-captured 3D image;
    converting each distance into a pixel value, and storing the pixel value of each character point into a character matrix of the pre-captured 3D image; and
    aligning all character matrices of the pre-captured 3D images based on a predetermined character point, and recording pixel values of same character points in different character matrices as the allowable range of the pixel value of the same character points.

11. A waste collection vehicle, comprising:
    a storage device;
    at least one processor; and
    one or more modules that are stored in the storage device and are executed by the at least one processor, the one or more modules comprising:
    an image obtaining module that obtains a digital image captured by an image capturing device positioned on the waste collection vehicle;
    a person detection module that detects a person in the digital image by converting a distance between a lens of the image capturing device and each point in the digital image into a pixel value of the point to create a character matrix of the digital image, comparing a pixel value of each point in the character matrix with a pixel value of a corresponding character point in a three dimensional (3D) image template, and determining an image sub-area in the digital image being the person when the image sub-area has a first specified number of points existing in the digital image, a pixel value of each point in the image sub-area being within an allowance range of a corresponding character point in the 3D image template; and
    a power management module that cuts off power being supplied to the waste collection vehicle using a safety device of the waste collection vehicle upon the condition that the person has been detected.

12. The waste collection vehicle according to claim 11, wherein the person detection module further determines a minimum distance between the lens of the image capturing device and each point on the person in the digital image upon the condition that the person has been detected.

13. The waste collection vehicle according to claim 12, wherein power management module further cuts off power being supplied to the waste collection vehicle using the safety device of the waste collection vehicle upon the condition that the minimum distance is less than a preset value.

14. The waste collection vehicle according to claim 11, wherein the one or more modules further comprise: an alarm message generation module that outputs alarm messages by lighting one or more signal lamps of the waste collection vehicle.

15. The waste collection vehicle according to claim 11, wherein the one or more modules further comprise: an alarm message generation module that outputs alarm messages using one or more buzzers or speakers of the waste collection vehicle.

16. The waste collection vehicle according to claim 11, wherein the one or more modules further comprise: a template creation module that creates the 3D image template that stores an allowable range of a pixel value of a character point according to a distance information in a plurality of 3D images captured by the image capturing device.

17. The waste collection vehicle according to claim 16, wherein the 3D image template is created by:
   reading a distance between the lens of the image capturing device and each character point of a subject of a pre-captured 3D image;
   converting each distance into a pixel value, and storing the pixel values of each character point into a character matrix of the pre-captured 3D image; and
   aligning all character matrices of the pre-captured 3D images based on a predetermined character point, and recording pixel values of same character points in different character matrices as the allowable range of the pixel value of the same character points.

\* \* \* \* \*